United States Patent [19]

Shimizu et al.

[11] 4,426,713
[45] Jan. 17, 1984

[54] SYNCHRONIZING CIRCUIT

[75] Inventors: Kazuyuki Shimizu, Machida; Minoru Koshino, Yokohama, both of Japan

[73] Assignee: Fujitsu Limited, Kanagawa, Japan

[21] Appl. No.: 303,589

[22] Filed: Sep. 18, 1981

[30] Foreign Application Priority Data

Sep. 27, 1980 [JP] Japan .................. 55-133681

[51] Int. Cl.³ .............................................. H04L 7/06
[52] U.S. Cl. .................................. 375/106; 370/108; 328/63
[58] Field of Search .............. 375/106, 108, 110, 111, 375/118; 370/100, 108; 328/63, 72; 307/480

[56] References Cited

U.S. PATENT DOCUMENTS

| 3,908,084 | 9/1975 | Wiley | 370/108 |
| 4,027,250 | 5/1977 | Lang | 375/118 |
| 4,119,796 | 10/1978 | Jones | 375/111 |
| 4,301,417 | 11/1981 | Jansen et al. | 375/108 |

Primary Examiner—Benedict V. Safourek
Assistant Examiner—Stephen Chin

[57] ABSTRACT

A synchronizing circuit provides a plurality of signal transmission paths having different delay times in the line for transmitting signals. A pilot signal circuit has a pilot signal generator circuit which operates on the sending side, and a pilot signal is sent via one of the paths having a different delay time to a plurality of latch circuits on the receiving side. The output of each of the latch circuits is compared by a predicting circuit, so as to predict the phase difference between the clock signals of sending clock system and the receiving clock system. According to the result of this prediction, the signal transmission path having the optimum delay time is selected, so as to transmit the received signal that has been synchronized to the latch on the receiving side.

11 Claims, 8 Drawing Figures

Fig. 8

SYNCHRONIZING CIRCUIT

BACKGROUND OF THE INVENTION

The present invention relates to a synchronizing circuit, and more specifically to a circuit for synchronizing the signals between clock systems which have the same period but have a varying phase difference, or of which the phase difference undergoes a change with a change in the period thereof.

In dealing with the signals between clock systems having a varying phase difference, a variety of methods have heretofore been employed to synchronize the signals. One method consists of receiving transmitted signals by latches having a plurality of stages and clocking the signals through based upon the clock system of a receiving side. According to the above method, however, even when the time periods of the clock system signals are fixed, the time until the pulse signal is output and received by a receiving side clock remains uncertain. When the transmitter signal is received barely in time for the setup time of the latch on the receiving side, the signal pulse is lost for one period. According to another method, signal paths having different delay times are provided, and an external switch or an internal control latch is set such that an optimum signal path is selected. This method, however, involves a clumsy operation, since a given path must be selected by setting a delay time, or a given delay time must be selected beforehand and another path must be selected when given path operation is not stable.

According to the above-mentioned methods, furthermore, it is not possible to exclusively determine the path when the period varies, or when the delay time in the receiving clock system changes.

SUMMARY OF THE INVENTION

The object of the present invention is to provide a circuit for synchronizing signals between clock systems which have a varying phase difference.

Another object of the present invention is to provide a synchronizing circuit which is capable of exclusively selecting a signal transmission path, even when the signal transmission delay time is changed between the transmitting clock system and the receiving clock system.

According to the present invention, there is provided a synchronizing circuit comprising a plurality of signal transmission paths having different delay times, which are provided in lines for transmitting the signals and a pilot signal generator circuit which operates on clock pulses of a sending side. Also included is a latch-setting circuit for setting pilot signals generated in said pilot signal generator circuit into a plurality of latches that operate on the clock pulses of the receiving side via paths having different delay times. Additionally included is a predicting circuit which compares the outputs of said plurality of latches to predict the phase difference between the clock pulse system of the sending side and the clock pulse system of the receiving side, and a selection circuit which guides the signals to be transmitted to the latches of the receiving side by selecting a signal transmission path having an optimum delay time based upon the output of the predicting circuit.

Further features and advantages of the present invention will become apparent from the ensuing description with reference to the accompanying drawings, to which, however, the scope of the invention is in no way limited.

DESCRIPTION OF THE PREFERRED EMBODIMENTS

Figure 1:
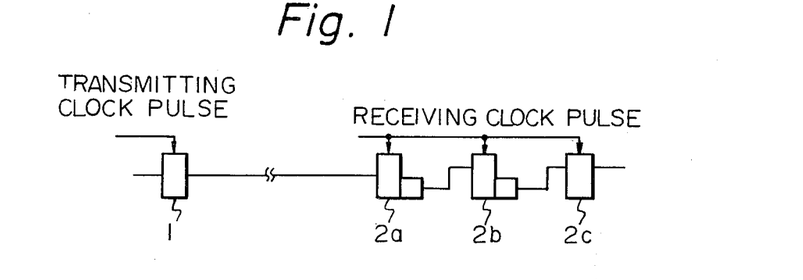
FIG. 1 is a block diagram illustrating a conventional synchronizing circuit.
Figure 2:
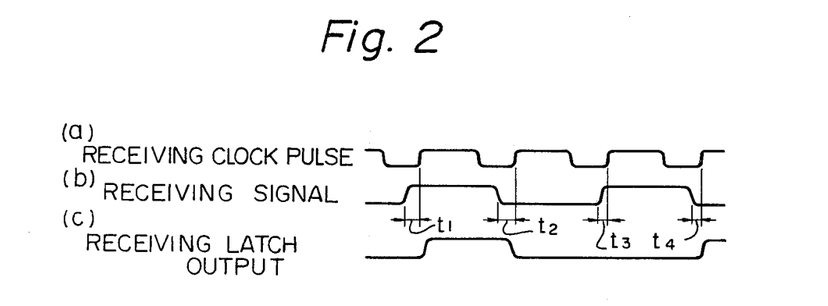
FIG. 2 is a diagram of waveforms illustrating the operation of the circuit of FIG. 1.

FIG. 1 shows a conventional synchronizing circuit, by which received signals are clocked through latches having a plurality of stages based upon the clock system of the receiving side. In FIG. 1, reference numeral 1 denotes a pulse transmitting circuit, and 2a, 2b and 2c denote synchronizing latch circuits. In time method of FIG. 1, even when the periods of the signals are fixed, the time when the received pulse signal is output and received by a clock of the receiving side remains uncertain, especially if the received signal reaches the latch of the receiving side at almost the same time as the setup time of one of the latches. This is shown in FIG. 2, in which (a) denotes clock pulses (negative side) from the receiving side, (b) denotes a pulse signal received, and (c) denotes an output of the latch circuits. In FIG. 2, $t_1 \approx t_2 \approx t_3 \approx t_4$, $t_1$ and $t_2$ are slightly greater than the setup time of the latch, and $t_3$ and $t_4$ are slightly smaller than the setup time of the latch. Therefore, FIG. 2 shows the state in which a received signal of one period is dropped.

Figure 3:
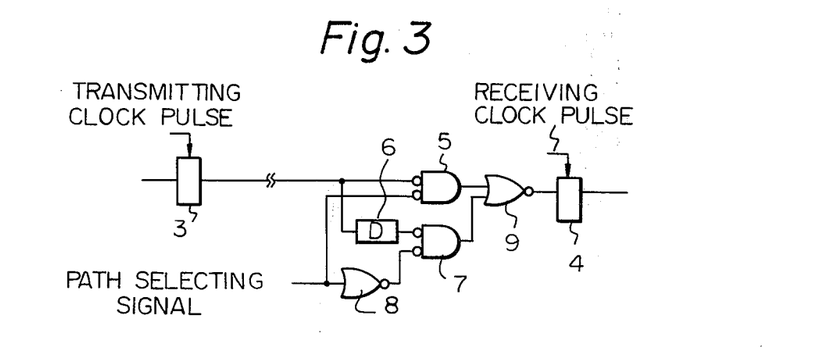
FIG. 3 is a block diagram illustrating another conventional synchronizing circuit.

Further, according to a conventional method shown in FIG. 3, paths having different delay times are provided, and an external switch or an internal control latch is set so that an optimum delay path is selected. In FIG. 3, reference numeral 3 denotes a transmitting circuit, 4 denotes a receiving circuit, reference numerals 5, 7, 9 and 8 denote gate circuits, and 6 denotes a delay circuit. In the circuit of FIG. 3, there are formed a first circuit which passes through an NOT-AND gate 5 and a second circuit which passes through the delay circuit 6 and the NOT-AND gate 7. The first and second circuits are selected by a switching signal via gate 8 in accordance with a phase difference between the clock pulses of the sending side and the clock pulses of the receiving side. According to the circuit of FIG. 3, however, the delay time is set beforehand for a given path, or a given path is selected beforehand, and another path is selected when the given path operation is not stable.

According to the conventional methods shown in FIGS. 1 and 3, the path cannot be exclusively determined when the period changes or when the signal transmission delay time changes between the clock pulses of the sending side and the clock pulses of the receiving side.

Figure 4:
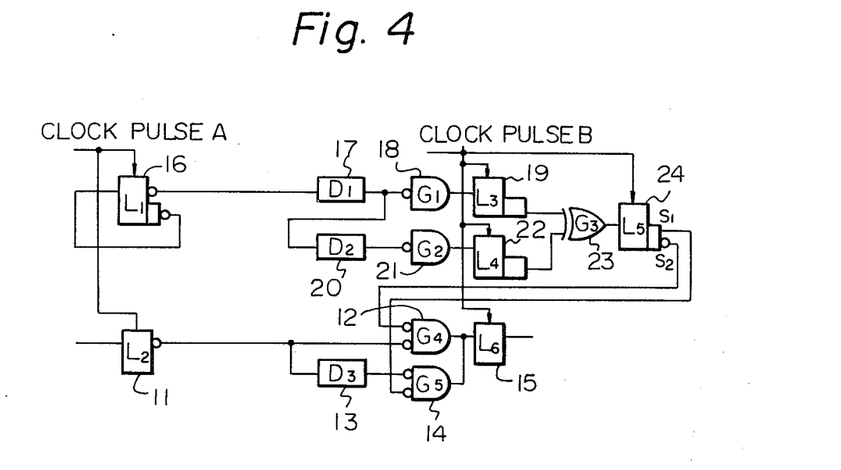
FIG. 4 is a block diagram of a synchronizing circuit according to an embodiment of the present invention.

An embodiment of the synchronizing circuit of the present invention will be mentioned below in detail. FIG. 4 illustrates an embodiment of the circuit of the present invention. In FIG. 4, a signal transmission circuit is illustrated which includes a latch circuit 11 ($L_2$) for transmitting signals on the sending side, a first NOT-AND gate 12 ($G_4$) of which a first input is connected to the latch circuit 11 on the sending side and a first delay circuit 13 ($D_3$) connected to the latch circuit 11 on the sending side. Also included in the transmission circuit are a second NOT-AND gate 14 ($G_5$) of which a first input is connected to the first delay circuit 13 and a latch circuit 15 ($L_6$) for transmitting synchronized signals to the receiving side, the latch circuit 15 being connected to the output terminals of the first and second NOT-AND gates, 12 and 14, respectively. Further, a latch-setting circuit illustrated in FIG. 4 includes a second delay circuit 17 ($D_1$) which is connected on the receiving side to a pilot signal generator circuit 16 ($L_1$) of the sending side, a first NOT circuit 18 ($G_1$) connected to the second delay 17 and a first flip-flop circuit 19 ($L_3$) which is connected to the NOT circuit 18 and which operates on the clock pulses of the receiving side. Also included in the latch setting circuit are a third delay circuit 20 ($D_2$) connected to the second delay circuit 17, a second NOT circuit 21 ($G_2$) connected to the third delay circuit 20 and a second flip-flop circuit 22 ($L_4$) which is connected to the second NOT circuit 21 and which operates on the clock pulses of the receiving side. A predicting circuit is illustrated in FIG. 4 which includes an exclusive OR circuit 23 ($G_3$) of which inputs are connected to the first and the second flip-flop circuits 19 and 22, respectively, and a flip-flop circuit 24 ($L_5$) which is connected to the output terminal of the exclusive OR circuit 23. The first and second outputs $S_1$ and $S_2$ of the third flip-flop circuit are fed to second input terminals of the first and second NOT-AND gates 12 and 14, respectively.

Figure 5:
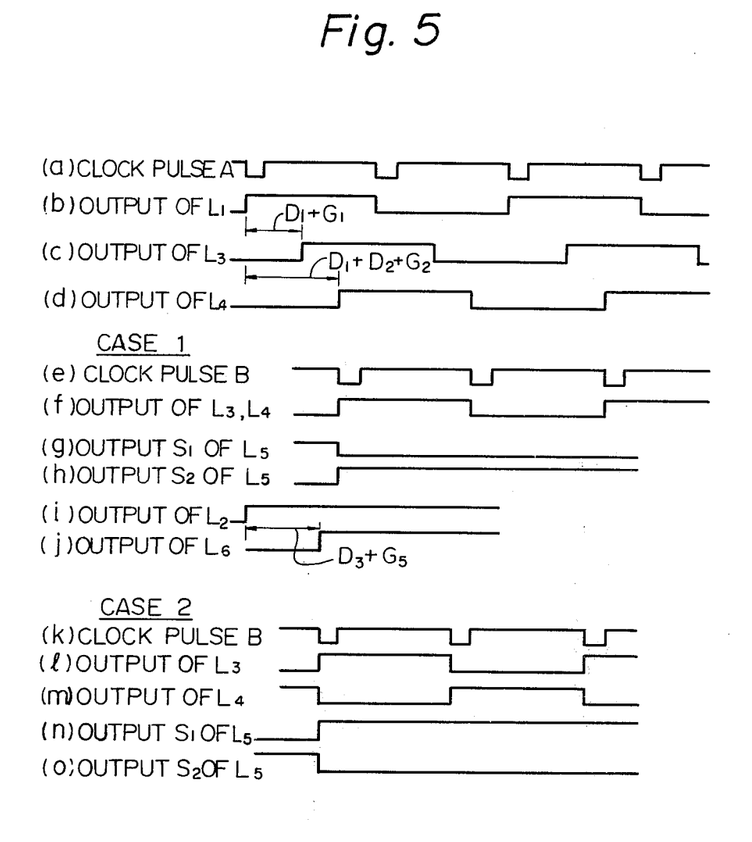
FIG. 5 is a time chart illustrating the operation of the circuit of FIG. 4.

In the circuit of FIG. 4, a transmission time through 16 ($L_1$)→17 ($D_1$)→18 ($G_1$)→19 ($L_3$) is denoted by $T_{13}$, a transmission time through 16 ($L_1$)→17 ($D_1$)→20 ($D_2$)→21 ($G_2$)→19 ($L_4$) is denoted by $T_{14}$, a transmission time through 11 ($L_2$)→12 ($G_4$)→15 ($L_6$) is denoted by $T_{26E}$, a transmission time through 11 ($L_2$)→13 ($D_3$)→14 ($G_5$)→15 ($L_6$) is denoted by $T_{26M}$, a value $T_{SH}$ is set to be slightly longer than the setup times and holding times of 19 ($L_3$), 22 ($L_4$) and 15 ($L_6$), and a clock period is denoted by $T_0$. In this case, if values of the delay circuits $D_1$, $D_2$ and $D_3$ are so determined that:

$$T_{14} - T_{26E} < T_0$$

$$T_{13} - T_{26E} \geq T_{SH}$$

$$T_{26M} - T_{13} \approx T_{14} - T_{26M} \geq T_{SH}$$

the operation of this circuit will be as illustrated in FIG. 5.

In FIG. 5, diagram (a) shows a waveform of a clock pulse A and the diagram (b) shows a waveform of an output of the pilot signal generation circuit 16 ($L_1$). The waveforms of flip-flops 19 ($L_3$) and 22 ($L_4$) lag behind the output waveform of the pilot circuit 16 ($L_1$) by $D_1 + G_1$ and $D_1 + D_2 + G_2$, respectively, as illustrated in diagrams (c) and (d).

In case 1, when the waveforms in diagrams (c) and (d) correspond to the clock pulse B, the output of flip-flop 19 ($L_3$) and the output of flip-flop 22 ($L_4$) assume the same waveform, as shown in diagram (f), and flip-flop 24 ($L_5$) produces an output $S_1$ of the level "0" as shown in diagram (g) and produces an output $S_2$ of the level "1" as shown in diagram (h). The inputs of AND gate 12 ($G_4$) and AND gate 14 ($G_5$) are then set by the above outputs. On the other hand, the output of latch 11 ($L_2$) is shown in diagram (i) and, in this case, a signal transmitted from latch 11 ($L_2$) is properly set in to latch 15 ($L_6$) through a path 11 ($L_2$)→13 ($D_3$)→14 ($G_5$). Diagram (j) illustrates an input waveform of latch 15 ($L_6$).

In case 2, when the waveforms (c) and (d) do not coincide with the clock pulse B, as shown in diagram (k), flip-flops 19 ($L_3$) and 22 ($L_4$) produce outputs as shown in diagrams (l) and (m), whereby the output $S_1$ of flip-flop 24 ($L_5$) assumes a value "1" and the output $S_2$ assumes a value "0". The transmitted signal is then properly set into latch 15 ($L_6$) via a path 11 ($L_2$)→12 ($G_4$).

In the circuit of FIG. 4, three or more paths and latch circuits may be provided to receive pilot signals, and the delay circuits may utilize a time difference of a master slave latch. Further, instead of inserting the second and third delay circuits 17 and 20 in the path for transmitting the pilot signals, the clock pulses of the flip-flop circuits 19 and 22 may be advanced by the same amounts of time, respectively, to obtain the same result.

Figure 6:
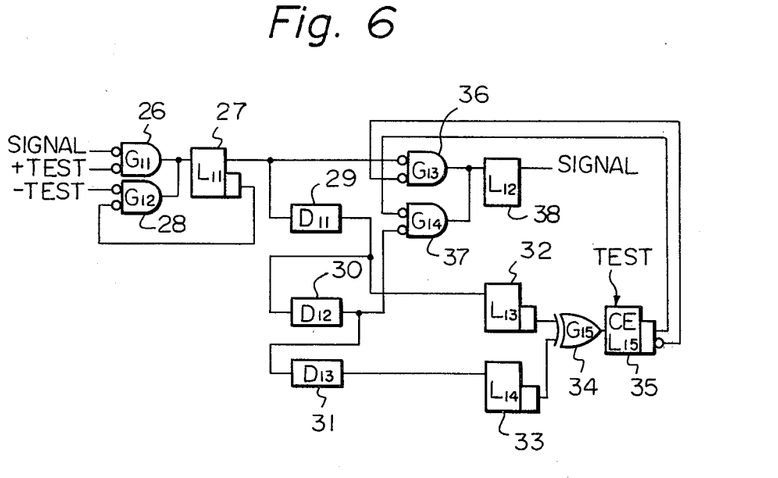
FIG. 6 is a block diagram of a synchronizing circuit according to another embodiment of the present invention.

FIG. 6 illustrates another embodiment of the circuit of the present invention. The circuit of FIG. 6 does not have a circuit specifically designed for the pilot signals that is included in the circuit of FIG. 4. In the circuit of FIG. 6, the pilot signal generator circuit has means for inverting the signals upon receipt of each clock pulse while the phase difference is being tested. Namely, FIG. 6 illustrates the pilot signal circuit which includes an NOT-AND gate 26 ($G_{11}$) which introduces through its input terminal a transmitted signal and a +TEST signal, flip-flop circuit 27 ($L_{11}$) connected to the output terminal of the NOT-AND gate 26, and the AND gate 28 ($G_{12}$) which introduces through its input terminals a −TEST signal and the output of the flip-flop circuit 27. The outputs of the NOT-AND gates 28 and 26 are connected to the input of the flip-flop circuit 27. A latch-setting circuit illustrated in FIG. 6 includes a first delay circuit 29 ($D_{11}$) connected to the flip-flop circuit 27 of the pilot signal generator circuit, a second delay circuit 30 ($D_{12}$) connected to an output of the first delay circuit 29 and a third delay circuit 31 ($D_{13}$) connected to an output of the second delay circuit 30. Also included in the latch setting circuit are a first flip-flop circuit 32 ($L_{13}$) connected to an output of the first delay circuit 29 and a second flip-flop circuit 33 ($L_{14}$) connected to an output of the third delay circuit 31. A predicting circuit illustrated in FIG. 6 includes an exclusive OR circuit 34 ($G_{15}$) connected to output terminals of the first and second flip-flop circuits 32 and 33, and a third flip-flop circuit 35 ($L_{15}$) which is connected to the output terminal of the exclusive OR circuit 34. The third flip-flop circuit 35 carries out the operation with every clock pulse during the phase difference testing mode and stops the operation when the phase difference is not being tested. A signal transmission path or circuit illustrated in FIG. 6, includes a first NOT-AND gate 36 ($G_{13}$) of which a first input terminal is connected to the flip-flop circuit 27 of the pilot signal generator circuit, a second NOT-AND gate 37 ($G_{14}$) of which a first input is connected to the output of the second delay circuit 30, and a latch circuit 38 ($L_{12}$) connected to output terminals of the first and second NOT-AND circuits 36 and 37, respectively. Here, the first and second outputs of the third flip-flop circuit 35 are fed to second input terminals of the first and second NOT-AND gates 36 and 37, respectively.

In the circuit of FIG. 6, a transmission time through 27 ($L_{11}$)→29 ($D_{11}$)→32 ($L_{13}$) is denoted by $T_{23}$, a transmission time through 27 ($L_{11}$)→29 ($D_{11}$)→30 ($D_{12}$)→31 ($D_{13}$)→33 ($L_{14}$) is denoted by $T_{24}$, a transmission time through 27 ($L_{11}$)→36 ($G_{13}$)→38 ($L_{12}$) is denoted by $T_{22E}$, a transmission time through 27 ($L_{11}$)→29 ($D_{11}$)→30 ($D_{12}$)→37 ($G_{14}$)→38 ($L_{12}$) is denoted by $T_{22M}$, and $T_{SH}$ and $T_0$ are selected to be the same as those of the circuit of FIG. 4. In this case, values of the delay circuits $D_{11}$, $D_{12}$ and $D_{13}$ are so determined as to satisfy the following relations:

$$T_{24} - T_{22E} < T_0$$

$$T_{23} - T_{22E} \geq T_{SH}$$

$$T_{22M} - T_{23} \approx T_{24} - T_{22M} \geq T_{SH}$$

Among the signals to be transmitted, at least one signal, for example, a signal "SIGNAL" of FIG. 6 is inverted upon each receipt of a clock pulse while the phase difference is being tested. On the receiving side, in this case, clock pulses are allowed to be received by the flip-flop circuit 35 ($L_{15}$) only during the test period. Thus, the flip-flop circuit 35 ($L_{15}$) stores measured results of the phase difference on the sending side and on the receiving side, like the cases of FIGS. 4 and 5. Therefore, either one path of the AND gate 36 or 37 ($G_{13}$ or $G_{14}$) should be selected by the output of the third flip-flop circuit 35 ($L_{15}$). The operation will be described below with reference to FIG. 7.

Figure 7:
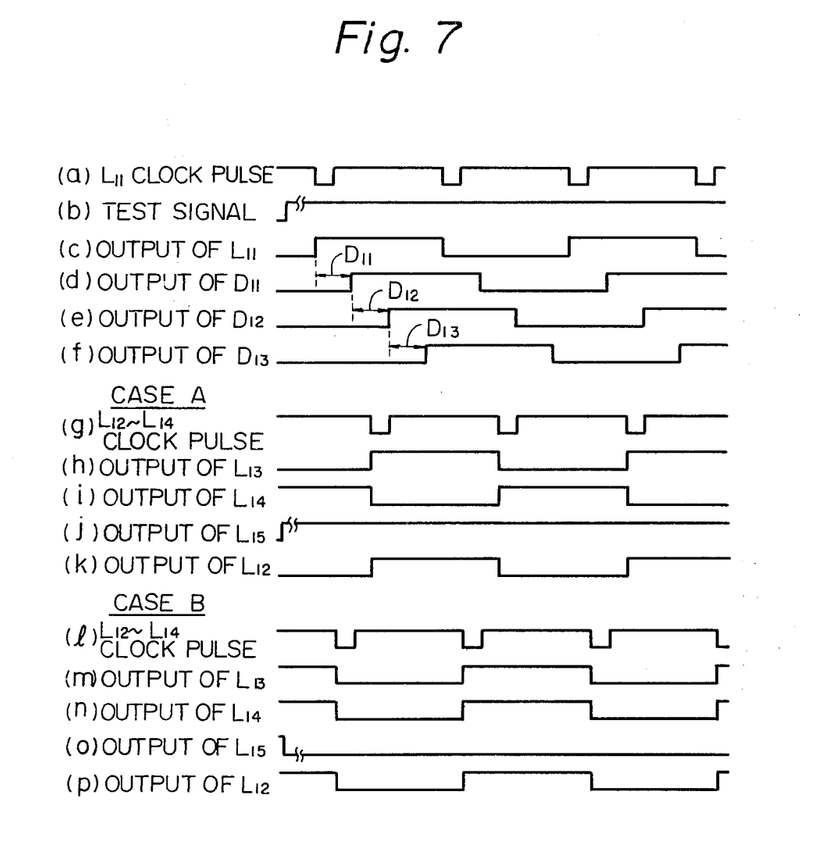
FIG. 7 is a time chart illustrating the operation of the circuit of FIG. 6.

In FIG. 7, diagram (a) shows a waveform of clock pulses of the flip-flop circuit 27 ($L_{11}$), diagram (b) shows a TEST signal, and diagram (c) shows an output waveform of the flip-flop circuit 27 ($L_{11}$). In this case, output waveforms of the delay circuits 29 ($D_{11}$), 30 ($D_{12}$) and 31 ($D_{13}$) become as shown in diagrams (d), (e) and (f). In the circuit of FIG. 6, the clock pulses of the flip-flop circuit 27 ($L_{11}$) and the clock pulses of the flip-flop circuits 32 ($L_{13}$), 33 ($L_{14}$) have different phases. Therefore, the flip-flop circuit 27 ($L_{11}$) is first flipped using the TEST signal of the level "1", and the result is set in the flip-flop circuit 32 ($L_{13}$) via the delay circuit 29 ($D_{11}$), and is also set in the flip-flop circuit 33 ($L_{14}$) via delay circuits 29 ($D_{11}$), 30 ($D_{12}$), 31 ($D_{13}$). In CASE A, if the phase relationship of the clock pulses is such that values set into the flip-flop circuits 32 ($L_{13}$) and 33 ($L_{14}$) contradict each other, as shown in the diagrams (h) and (i), the output value of the flip-flop circuit 35 ($L_{15}$) assumes the level "1" as shown in the diagram (j), and a path from the flip-flop circuit 27 ($L_{11}$) to the latch circuit 38 ($L_{12}$) via the first AND gate 36 is selected. Diagram (k) illustrates a synchronized output of the latch circuit 38 ($L_{12}$). In CASE B, when the phase relationship of the clock pulses is such that values set into the flip-flop circuits 32 ($L_{13}$) and 33 ($L_{14}$) have the same value as each other, as shown in diagrams (m) and (n), the output of the flip-flop circuit 35 ($L_{15}$) assumes the level "0" as shown in the diagram (o), and a path from the flip-flop circuit 27 ($L_{11}$) to the latch circuit 38 ($L_{12}$) via the second AND gate 37 is selected. Diagram (p) illustrates the output of the latch circuit 38 ($L_{12}$). When the value of the flip-flop circuit 35 ($L_{15}$) is determined, depending upon the case A or the case B, the TEST signal is set to "0", the value of the flip-flop circuit 35 ($L_{13}$) is fixed, and the flipping operation of the flip-flop circuit 27 ($L_{11}$) is stopped. Under this condition, the level of the signal SIGNAL is changed to "0" and "1"; signals are transmitted from the flip-flop circuit 27 ($L_{11}$) and synchronized signal output therefrom to the latch circuit 38 ($L_{12}$).

Figure 8:
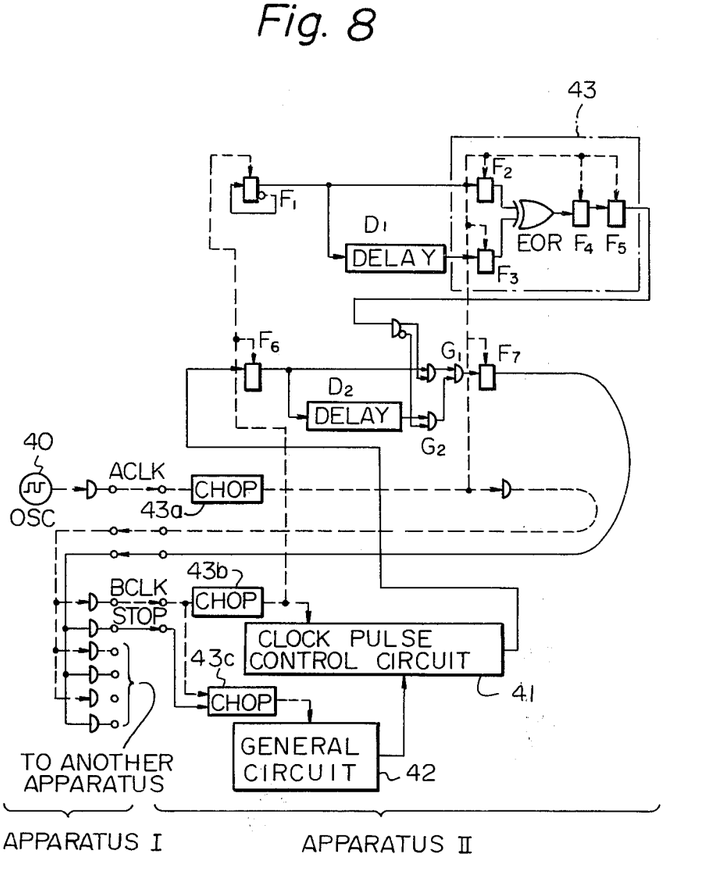
FIG. 8 illustrates a circuit to which the present invention is applied.

An example of the synchronizing circuit of the present invention is mentioned below with reference to FIG. 8, in which apparatus I provides a clock generator )OCS) 40, and distributor clock pulses ACLK, BCLK and stop pulses STOP to the apparatuses in the system. Apparatus II functions to produce stop pulses based upon the clock control circuit 41 and relaying clock pulses. The apparatus II includes general circuit 42. Other apparatuses inclusive of the general circuit of the apparatus II subject all of the clock pulses and stop pulses to an AND function, and use the outputs as gate clocks. To halt and operate the clock pulses, it is necessary to turn the stop pulses on and off. The same holds true for controlling a so-called single clock mode or the like. In FIG. 8, a dotted line denotes a clock system, a solid line denotes a signal system, and 43a, 43b and 43c denote chopping (differentiation) circuits.

In the circuit of FIG. 8, if a delay time from the generator (OSC) 40 to $F_1$, $F_6$, clock pulse control circuit 41, and general circuit 42 is denoted by M, and a delay time from the generator 40 to $F_2$, $F_3$, $F_4$, $F_5$ and $F_7$ is denoted by N, there develops a phase difference N-M.

Here, the values are so set that:

$$Td_1 < Td_3 < Td_2 < Td_4$$

$$Td_2 - Td_1 \approx Td_4 - Td_3 > \text{width of clock pulse}$$

$$Td_3 - Td_1 > T\text{set}, \quad Td_4 - Td_2 > T\text{set},$$

where Tset denotes a setup time and a hold time of the flip-flop circuit, $Td_1$ denotes a delay time from $F_1$ to $F_2$, $Td_2$ denotes a delay time from $F_1 \rightarrow D_1 \rightarrow F_3$, $Td_3$ denotes a delay time from $F_6 \rightarrow G_1 \rightarrow F_7$, and $Td_4$ denotes a delay time from $F_6 \rightarrow D_2 \rightarrow G_2 \rightarrow F_7$.

When a clock period of the clock oscillator (OSC) 40 is denoted by T, and the phase difference N-M is given by $$T - [(N-M)/T] \times T - Tdnm$$

the transmission from $F_6$ to $F_7$ develops a phase difference T−Tdnm. Therefore, when, $$T - Tdnm > Td_3 + T\text{set}$$

the signals are properly transmitted from $F_6$ to $F_7$. However, when, $$T - Tdnm \leq Td_3 + T\text{set}$$

the signals are not correctly transmitted from $F_6$ to $F_7$. That is to say, the circuit properly operates in some cases, but erroneously operates in other cases.

Therefore, when the synchronizing circuit 43 establishes the relations T−Tdnm>$Td_1$+Tset and T−Tdnm>$Td_1$+Tset, the value set by the clock pulses of $F_2$ and $F_3$ becomes the same value, and the circuit 43 establishes the relations, T−Tdnm>$Td_1$+Tset and T−Tdnm<$Td_2$+Tset, or $T-Tdnm<Td_1+Tset$ and $T-Tdnm<Td_2+Tset$, the value set by the clock pulses of $F_2$ and $F_3$ may be the same value or may be a different value.

Therefore, when the value set by the clock pulses of $F_2$ and $F_3$ have a same value, a path $F_6 \rightarrow G_1 \rightarrow F_7$ is selected. When the value set by the clock pulses of $F_2$ and $F_3$ has a different value, a path $F_6 \rightarrow D_2 \rightarrow G_2 \rightarrow F_7$ is selected.

Consequently, the signals are synchronized without requiring human skill, and the flip-flop circuit $F_7$ is stabalized at all times. Further, even when the clock period of the oscillator (OSC) 40 is varied, the synchronizing circuit of the present invention can quickly respond to clock pulses of any period.

According to the present invention, as illustrated in detail in the foregoing, the delay time of the signal transmission path can be automatically adjusted no matter how the phase difference changes between the transmitting clock system and the receiving clock system, without requiring human skill.

I claim:

1. A synchronizing circuit operatively connectable to receive an unsynchronized signal and first and second clock signals, and for generating a synchronized signal, comprising:
    a pilot signal generating circuit, comprising a pilot flip-flop operatively connectable to receive the first clock signal, for generating a pilot signal in dependence on the first clock signal;
    a latch setting circuit, operatively connected to said pilot flip-flop of said pilot signal generating circuit and operatively connectable to receive the second clock signal, for storing the pilot signal as delay path selection information in dependence upon a phase difference between the first and second clock signals, said latch setting circuit comprising:
    a first delay circuit operatively connected to said pilot flip-flop;
    a second delay circuit operatively connected to said first delay circuit;
    a first NOT circuit operatively connected to said first delay circuit;
    a second NOT circuit operatively connected to said second delay circuit;
    a first flip-flop operatively connected to said first NOT circuit, and operatively connectable to receive the second clock signal; and
        a second flip-flop operatively connected to said second NOT circuit, and operatively connectable to receive the second clock signal;
        a predicting circuit, operatively connected to said first and second flip-flops of said latch setting circuit and operatively connectable to receive the second clock signal, for generating delay path selection signals in dependence upon the delay path selection information and the second clock signal; and
        a signal transmission circuit, operatively connected to said predicting circuit and operatively connectable to receive the unsynchronized signal and the first and second clock signals, for generating the synchronized signal in dependence upon the delay path selection signals, the first and second clock signals and the unsynchronized signal.

2. A synchronizing circuit according to claim 1, wherein said predicting circuit comprises:
    an exclusive OR circuit operatively connected to said latch setting circuit; and
    a flip-flop operatively connected to said exclusive OR circuit and said signal transmission circuit, and operatively connectable to receive the second clock signal.

3. A synchronizing circuit according to claim 1, wherein said signal transmission circuit comprises:
    a first latch circuit operatively connectable to receive the unsynchronized signal and the first clock signal;
    a delay circuit operatively connected to said first latch circuit;
    a first NOT-AND circuit operatively connected to said predicting circuit and said first latch circuit;
    a second NOT-AND circuit operatively connected to said delay circuit and said predicting circuit; and
    a second latch circuit, operatively connectable to receive the second clock signal and operatively connected to said first and second NOT-AND circuits, for outputting the synchronized signal.

4. A synchronizing circuit operatively connectable to receive an unsynchronized signal and first and second clock signals, and for generating a synchronized signal, comprising:
    a pilot signal generating circuit, operatively connectable to receive the first clock signal and the unsynchronized signal, for generating a pilot signal in dependence on the first clock signal and the synchronized signal;
    a latch setting circuit, operatively connected to said pilot signal generating circuit and operatively connectable to receive the second clock signal, for storing the pilot signal as delay path selection information;
    a predicting circuit, operatively connected to said latch setting circuit, for generating delay path selection signals in dependence upon the delay path selection information; and
    a signal transmission circuit, operatively connected to said predicting circuit, said latch setting circuit and said pilot signal generating circuit and operatively connectable to receive the second clock signal, for generating the synchronized signal in dependence upon the pilot signal, the delay path selection signals, the path selection information and the second clock signal.

5. A synchronizing circuit according to claim 4, wherein said synchronizing circuit is operatively connectable to receive first and second test signals, and
    wherein said pilot signal generating circuit comprises:
    a first NOT-AND circuit operatively connectable to receive the unsynchronized signal and the first test signal;
    a second NOT-AND circuit operatively connectable to receive the second test signal; and
    a flip-flop operatively connected to said first and second NOT-AND circuits, said latch setting circuit and said signal transmission circuit.

6. A synchronizing circuit according to claim 4, wherein said predicting circuit comprises:
    an exclusive OR circuit operatively connected to said latch setting circuit; and
    a flip-flop operatively connected to said exclusive OR circuit and said signal transmission circuit.

7. A synchronizing circuit according to claim 4, wherein said latch setting circuit comprises:

a first delay circuit operatively connected to said pilot signal generating circuit;

a second delay circuit operatively connected to said first delay circuit and said signal transmission circuit;

a third delay circuit operatively connected to said second delay circuit;

a first flip-flop operatively connected to said first delay circuit and said predicting circuit; and a second flip-flop operatively connected to said third delay circuit and said predicting circuit.

8. A synchronizing circuit according to claim 4, wherein said signal transmission circuit comprises:

a first AND operatively connected to said pilot signal generating circuit and said predicting circuit;

a second AND circuit operatively connected to said predicting circuit and said latch setting circuit; and a latch circuit, operatively connected to said first and second AND circuits, for outputing the synchronized signal.

9. A synchronizing circuit operatively connectable to receive receiving side clock pulses, sending side clock pulses and signals to be transmitted, comprising:

signal transmission paths having different delay times, which are provided in lines for transmitting the signals, said signal transmission paths comprising:

a first latch circuit for receiving the signals to be transmitted on the sending side; and a first delay circuit operatively connected to said first latch circuit;

a pilot signal generator circuit, operatively connectable to receive the sending side clock pulses of a sending side, for generating pilot signals;

a latch-setting circuit, operatively connected to said pilot signal generator circuit, for sending said pilot signals through delay paths having different delay times, and having a plurality of latches that operate on the receiving side clock pulses of the receiving side, said latch-setting circuit comprising:

a second delay circuit operatively connected to said pilot signal generator circuit;

a first NOT circuit operatively connected to said second delay circuit;

a first flip-flop circuit, operatively connected to said first NOT circuit, which operates on the clock pulses of the receiving side;

a third delay circuit operatively connected to said second delay circuit;

a second NOT circuit operatively connected to said third delay circuit; and a second flip-flop circuit, operatively connected to said second NOT circuit, which operates on the clock pulses of the receiving side;

a predicting circuit, operatively connected to said first and second flip-flop circuits of said latch setting circuit, which comprises the outputs of said first and second flip-flop circuits to predict the phase difference between the sending clock pulses of the sending side and the receiving clock pulses of the receiving side and generates an output, said predicting circuit comprising:

an exclusive OR circuit operatively connected to said first and second flip-flop circuits; and a third flip-flop circuit operatively connected to said exclusive OR circuit; and a selection circuit, operatively connected to said signal transmission paths and said third flip-flop circuit, which guides the signals to be transmitted by selecting a signal transmission path having an optimum delay time in dependence upon the output of said predicting circuit, said selection circuit comprising:

a first NOT-AND gate having a first input operatively connected to said first latch circuit and a second input operatively connected to said third flip-flop circuit;

a second NOT-AND gate having first input operatively connected to said first delay circuit, and a second input operatively connected to said third flip-flop circuit; and a second latch circuit for transmitting synchronized signals to a receiving side, said second latch circuit is operatively connected to said first and second NOT-AND gates; and when a transmission time from said pilot signal generator circuit to said first flip-flop circuits is denoted by $T_{13}$, a transmission time from said pilot signal generator circuit to said second flip-flop circuit is denoted by $T_{14}$, a transmission time from said first latch circuit via said first NOT-AND gate to said second latch circuit is denoted by $T_{26E}$, a transmission time from said first latch circuit via said first delay circuit and second NOT-AND gate to said second latch circuit is denoted by $T_{26M}$, a value $T_{SH}$ is slightly longer than the set-up times and the holding times of said first and second flip-flop circuits and said second latch circuit, and a clock pulse period is denoted by $T_0$, delay values of said first, second and third delay circuits are so determined that:

$$T_{14} - T_{26E} < R_0$$

$$T_{13} - T_{26E} \leq T_{SH}$$

$$T_{26M} - T_{13} \approx T_{14} - T_{26M} \geq T_{SH}.$$

10. A synchronizing circuit operatively connectable to receive side clock pulses, sending clock side pulses and signals to be transmitted, comprising:

signal transmission paths having different delay times, which are provided in lines for transmitting the signals, said signal transmission paths comprising:

a first NOT-AND circuit; and a second NOT-AND circuit;

a pilot signal generator circuit, operatively connectable to receive the sending side clock pulses of a sending side for generating pilot signals, said pilot signal generator circuit comprising:

means for inverting the signal to be transmitted upon receipt of each sending side clock pulse while a phase difference between the receiving side clock pulses and the sending side clock pulses is being tested; and a pilot flip-flop circuit operatively connected to said means for inverting and to said first NOT-AND circuit;

a latch-setting circuit, operatively connected to said pilot flip-flop, for sending said pilot signals through delay paths having different delay times, and having a plurality of flip-flop circuits that operate on the receiving side clock pulses of the receiving side, said latch-setting circuit comprising:

a first delay circuit operatively connected to said pilot flip-flop circuit;

a second delay circuit operatively connected to said first delay circuit and said second NOT-AND circuit;

a third delay circuit operatively connected to said second delay circuit;

a first flip-flop circuit operatively connected to said first delay circuit; and a second flip-flop circuit operatively connected to said third delay circuit;

a predicting circuit, operatively connected to said first and second flip-flop circuits, which compares the outputs of said first and second flip-flop circuits to predict the phase difference between the sending clock pulses of the sending side and the receiving clock pulses of the receiving side and generates an output, said predicting circuit comprising:

an exclusive OR circuit operatively connected to said first and second flip-flop circuits; and a third flip-flop circuit, operatively connected to said exclusive OR circuit and said first and second NOT-AND circuits, which is operated upon receipt of each clock pulse while the phase difference is being tested and which stops the testing operation while the phase difference is not being tested; and a selection circuit, operatively connected to said first and second NOT-AND circuits, which provides the signals to be transmitted at an optimum delay time in dependence upon the output of said predicting circuit provided to said first and second NOT-AND circuits, said selection circuit comprising a latch circuit operatively connected to said first and second NOT-AND circuits; and when a transmission time from said pilot signal generator circuit to said first flip-flop circuit is denoted by $T_{23}$, a transmission time from said pilot signal generator circuit to said second flip-flop circuit is denoted by $T_{24}$, a transmission time from said first latch circuit vis said first NOT-AND gate to said second latch circuit is denoted by $T_{22E}$, a transmission time from said first latch circuit via said first delay circuit and said second NOT-AND gate to said second latch circuit is denoted by $T_{22M}$, a value $T_{SH}$ is slightly longer than the setup times and the holding times of said first and second flip-flop circuits and said second path circuit, and a clock pulse period is denoted by $T_0$, delay values of said first, second and third delay circuits are so determined that:

$$T_{24} - T_{22E} < T_0$$

$$T_{23} - T_{22E} \geq T_{SH}$$

$$T_{22M} - T_{23} \approx T_{24} - T_{22M} \geq T_{SH}.$$

11. A synchronizing circuit according to claim 10, wherein said means for inverting the signal to be transmitted upon receipt of each sending side clock pulse while the phase difference is being tested is operatively connectable to receive a +test signal and a −test signal and comprises:

a first pilot NOT-AND circuit, operatively connectable to receive through its input terminals the signal to be transmitted and the +test signal, for generating a first output;

said pilot flip-flop circuit operatively connected to said first pilot NOT-AND circuit and generating a flip-flop output signal; and a second pilot NOT-AND circuit operatively connected to said pilot flip-flop circuit and operatively connectable to receive through its input terminals the −test signal and the flip-flop output signal of said pilot flip-flop circuit, and which produces a second output to said pilot flip-flop circuit together with the first output of said first pilot NOT-AND circuit.

* * * * *

UNITED STATES PATENT AND TRADEMARK OFFICE
CERTIFICATE OF CORRECTION

PATENT NO. : 4,426,713
DATED : JANUARY 17, 1984
INVENTOR(S) : KAZUYUKI SHIMIZU ET AL.

It is certified that error appears in the above-identified patent and that said Letters Patent is hereby corrected as shown below:

FRONT PAGE [73] Assignee,
"Kanagawa" should be --Kawasaki--;

AFTER "Assistant Examiner -"Stephen Chin" insert on next line
--Attorney, Agent or Firm-Staas & Halsey--.

Col. 2, line 30, "time" should be --the--;
line 31, "the" (first occurrence) should be --time--

Col. 3, line 21, after "delay" insert --circuit--.

Col. 4, line 7, "in to" should be --into--;
line 38, after "nal" insert --a--;
line 39, "the" (second occurrence) should be --an--

Col. 6, line 6, delete "and synchronized signal output therefrom";
line 7, after "($L_{12}$)" insert --and synchronized signal output therefrom--;

UNITED STATES PATENT AND TRADEMARK OFFICE
CERTIFICATE OF CORRECTION

PATENT NO. : 4,426,713
DATED : JANUARY 17, 1984
INVENTOR(S) : KAZUYUKI SHIMIZU ET AL.

Page 2 of 2

It is certified that error appears in the above-identified patent and that said Letters Patent is hereby corrected as shown below:

line 11, ")OCS)" should be --(OCS)--;
        line 48, [formula], "T-Tdnm" should be --T=Tdnm--.

Col. 8, line 29, "syn-" should be --unsyn- --.

Col. 9, line 14, after "AND" insert --circuit--;
        line 56, "comprises" should be --compares--.

Col. 11, line 39, "vis" should be --via--.

Col. 12, line 7, "path" should be --latch--.

Signed and Sealed this

Tenth Day of July 1984

[SEAL]

Attest:

GERALD J. MOSSINGHOFF

*Attesting Officer*      *Commissioner of Patents and Trademarks*